UNITED STATES PATENT OFFICE.

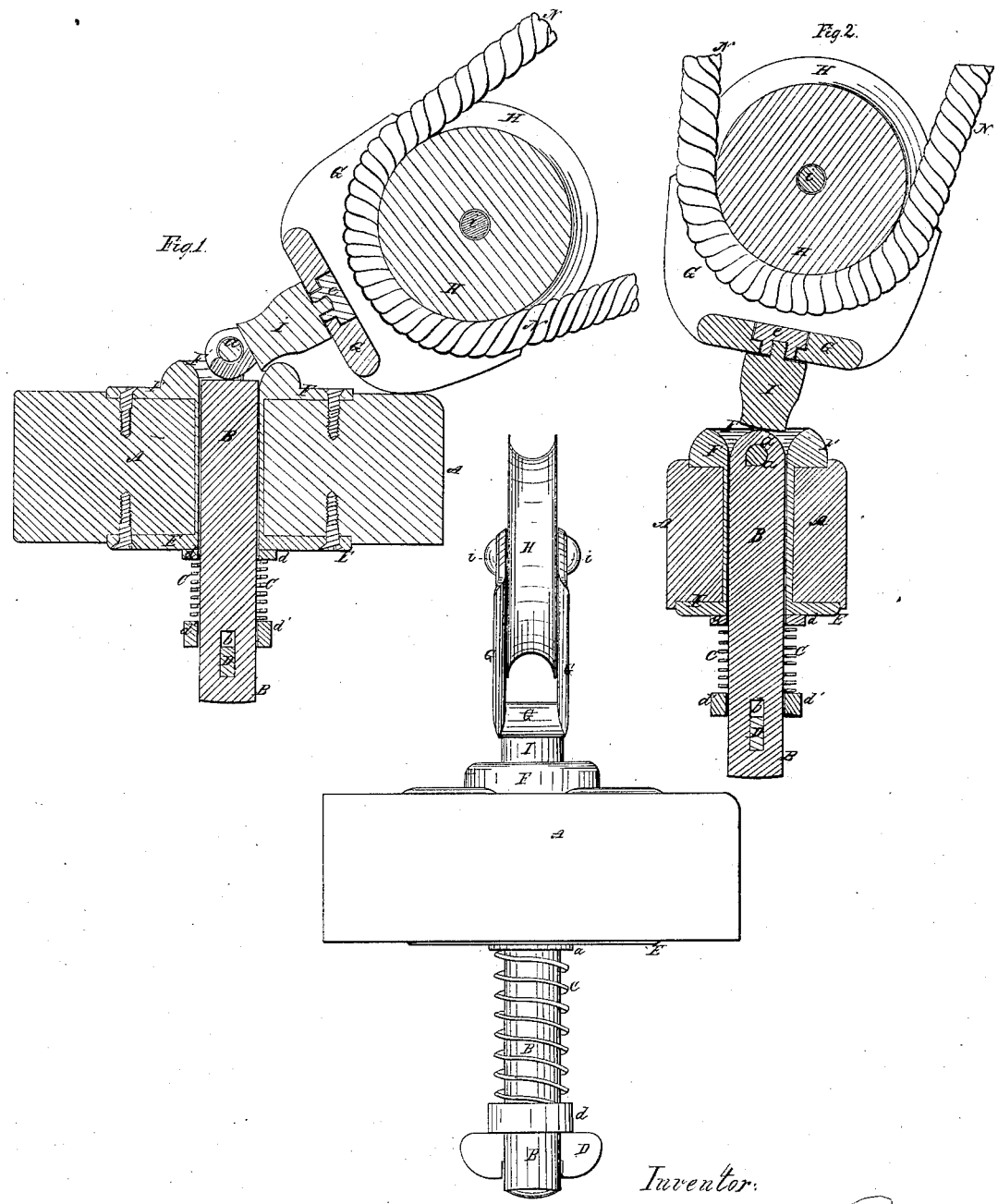

GEORGE FOCHT, OF READING, PENNSYLVANIA.

ATTACHMENT FOR TACKLE-BLOCKS.

Specification forming part of Letters Patent No. 21,602, dated September 28, 1858; Reissued January 17, 1865, No. 1,853.

*To all whom it may concern:*

Be it known that I, GEORGE FOCHT, of Reading, county of Berks, in the State of Pennsylvania, have invented certain new and useful Improvements in Attaching Tackle-Blocks; and I do hereby declare that the following is a full and exact description thereof, reference being had to the accompanying drawings and to the letters of reference marked thereon.

The nature of my invention consists in a tackle block so constructed and combined with a shank as hereinafter described, that the block will always be in the most desirable relative position with the rope, passing around the pulley, as will be hereinafter fully explained.

To enable those skilled in the art to make and use my invention, I will proceed to describe its construction and operation, referring by letter to the accompanying drawings forming part of this specification: and in which, Figure 1, represents a vertical section through the center of my improved tackle block and, Fig. 2, a similar section with the parts in a different relative position to that illustrated at Fig. 1.

A, represents a portion of a beam to which the tackle block is attached.

B, is a spindle, passing through a hole made in the beam A, to accommodate it; which spindle is formed with an eye, $a$, at its upper, or that end, adjacent to the block, and is pierced with a key hole, $b$, at its other end.

C, is a spiral spring.
D, is a key.
$d$, $d'$, are washers.

E, is a plate on under side of beam and F, a plate and socket on upper side of beam.

I, is a stud piece, linked into the eye (in upper end of spindle B,) at its lower end, and screwed into a bushing, $e$, in the butt of the block, G, at its upper end.

H, is the pulley, which is pivoted by a stud $i$, into the block H. The socket F', it will be seen is bell mouthed or flared open at its upper end, to allow the stud piece I, to turn freely in all directions on the end of spindle B, where said spindle is in position, as seen at Fig. 2, while the stud piece I, being secured to the bushing, $e$, (which latter is free to turn in the butt of the block G,) allows the block G, to turn freely on the stud piece I.

The operation of my improved block will be readily understood from the following explanation, in connection with the description of its construction as hereinbefore given. The several parts being constructed and arranged together as represented in the drawings a rope N, is passed around the pulley in the usual way; as soon as the rope is put under strain or made taut, the spindle B, is pulled through the hole in the beam A, and made to assume the position seen at Figs. 1 and 2 of the drawings the spiral spring C, being compressed; it will be seen that when the spindle is in this position the stud piece I can swing around freely in all directions, it will also be observed that the spindle B may turn around in its hole or bearing and that the block G, can freely turn on the stud piece I. Consequently the block G, carrying the pulley, is capable of turning freely in any and all directions (when the spindle is pulled up as seen in the drawings) to accommodate itself to the variable directions in which the ropes may be made to run.

When the strain is taken off the rope the spiral spring C, (being sufficiently strong) pulls the spindle back or down into its bearing, bringing within the socket F', the stud piece I, which cannot then tip in any direction, but is compelled to remain in a vertical position, or to keep in a line with the spindle, and rigidly retain the block in the proper relative position with the rope, as left, when the strain ceased; so that on applying the strain or again tightening to the rope the pulley is in exactly the right relative position with the rope to be operated upon by it without straining or scraping the latter on its edges.

Having described my improvement, what I claim as my invention and desire to secure by Letters Patent is:—

So attaching a tackle block that it may turn freely in all directions, and be retained in the proper relative position with the rope, when the strain on the rope ceases, in the manner substantially as described.

GEORGE FOCHT.

Witnesses:
C. L. HERRMANN,
GEORGE PRINTZ.

[FIRST PRINTED 1911.]